United States Patent
Ingersoll, Jr. et al.

(10) Patent No.: US 6,439,511 B1
(45) Date of Patent: Aug. 27, 2002

(54) THERMAL SHOCK AVOIDANCE FOR SATELLITE SOLAR PANELS

(75) Inventors: James H. Ingersoll, Jr., Lakewood; Richard A. Fowell, Culver City, both of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/625,690

(22) Filed: Jul. 26, 2000

(51) Int. Cl.$^7$ ................................................ B64G 1/44
(52) U.S. Cl. ..................................................... 244/173
(58) Field of Search ........................... 244/158 R, 168, 244/173

(56) References Cited

U.S. PATENT DOCUMENTS

| | | | |
|---|---|---|---|
| 5,211,360 A | | 5/1993 | Zimbelman |
| 5,517,418 A | | 5/1996 | Green et al. |
| 5,563,794 A | | 10/1996 | Cosner et al. |
| 5,620,529 A | | 4/1997 | Bassily et al. |
| 5,720,452 A | | 2/1998 | Mutschler, Jr. |
| 5,794,891 A | * | 8/1998 | Polle et al. .................. 244/164 |
| 5,895,014 A | * | 4/1999 | Sullivan ...................... 244/168 |
| 5,957,408 A | * | 9/1999 | Hall et al. ............... 244/158 R |
| 6,070,833 A | * | 6/2000 | Burke et al. ................ 244/168 |
| 6,227,497 B1 | * | 5/2001 | Draim ........................ 244/173 |
| 6,260,806 B1 | * | 7/2001 | Williams et al. ........... 244/164 |

FOREIGN PATENT DOCUMENTS

FR 2479568 * 10/1981 ................. 244/173

OTHER PUBLICATIONS

An Evaluation of Thermally–Induced Structural Disturbances of Spacecraft Solar Arrays, J.D. Johnston et al, Unviersity of VA, Dept of Mechanical, Aerospace and Nuclear Engineering, Charlottesville, VA 22903, pp 1–60–7803–3547–3–7/16, 1996 IEEE.

* cited by examiner

Primary Examiner—Galen L. Barefoot
(74) Attorney, Agent, or Firm—Fitch, Even, Tabin & Flannery

(57) ABSTRACT

A solar wing control system for avoiding thermal shock to a solar wing includes an eclipse exit slew profile generator having an eclipse exit slew rate output for rotating the solar wing from an eclipse exit angle to a solar power generation angle to control solar wing heating rate.

22 Claims, 5 Drawing Sheets

THERMAL SHOCK AVOIDANCE FOR SATELLITE SOLAR PANELS

BACKGROUND OF THE INVENTION

The present invention relates generally to attitude control of orbital satellites. More specifically, but without limitation thereto, the present invention relates to avoiding thermal shock to a satellite solar panel as it enters and exits the earth's shadow.

Sudden changes in the shape of materials in space may occur during the rapid transitions between exposure to sunlight and shade. The temperature changes resulting from these transitions are thermal shocks that may cause large solar panels to snap or buckle, imparting a torque to the satellite. This torque may disturb the attitude of the satellite and affect critical aiming of its beam antennas. As higher power requirements demand solar panels with increasing surface area and mass, the torque impulses from thermal shock become more severe, while at the same time tighter beam antenna pointing requirements become more sensitive to the resulting antenna misalignment.

Feed forward or open loop attitude control methods based on analysis and orbit data may exacerbate the problem of thermal shock unless the timing of the attitude disturbance can be predicted with high accuracy. Because of variation in the sun's declination, ephemeris error, manufacturing tolerances, material quality, and design variability, it has been difficult to predict the timing well enough to use feed forward or open loop techniques advantageously.

SUMMARY OF THE INVENTION

The present invention advantageously addresses the needs above as well as other needs by providing a method and apparatus for avoiding thermal shock to a satellite solar wing.

In one embodiment, the invention may be characterized as a solar wing control system for avoiding thermal shock to a solar wing that includes an eclipse exit slew profile generator having an eclipse exit slew rate output for rotating the solar wing from an eclipse exit angle to a solar power generation angle to control solar wing heating rate.

In another embodiment, the invention may be characterized as a method for avoiding thermal shock to a solar wing by rotating the solar wing from an eclipse exit angle to a solar power generation angle to control solar wing heating rate.

The features and advantages summarized above in addition to other aspects of the invention will become more apparent from the description, presented in conjunction with the following drawings.

BRIEF DESCRIPTION OF THE DRAWINGS

The above and other aspects, features and advantages of the present invention will be more apparent from the following more specific description thereof, presented in conjunction with the following drawings wherein.

DETAILED DESCRIPTION OF THE DRAWINGS

The following description is presented to disclose the currently known best mode for making and using the present invention. The scope of the invention is to be defined by the claims.

Figure 1A:
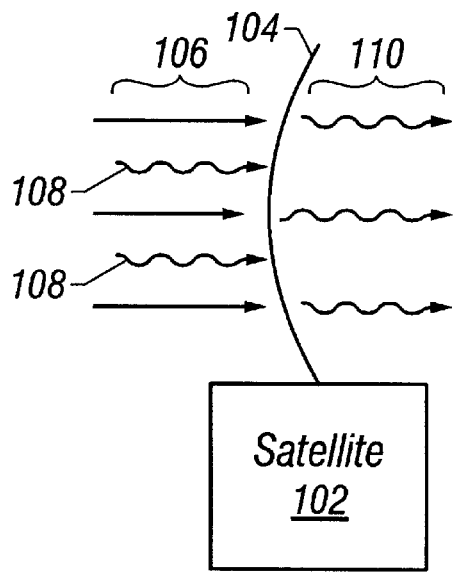
FIGS. 1A–1C are diagrams of a spacecraft equipped with a solar wing experiencing thermal shock as the spacecraft enters, traverses, and exits solar eclipse.
Figure 1B:
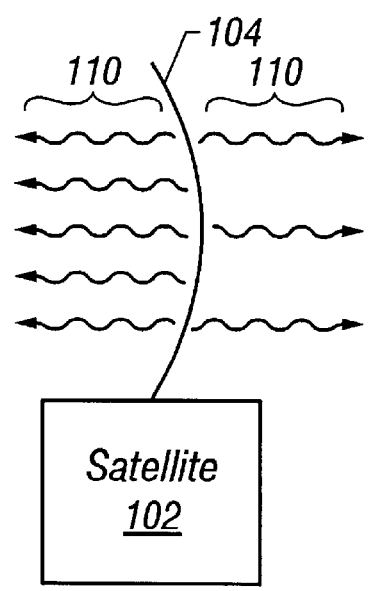
Figure 1C:
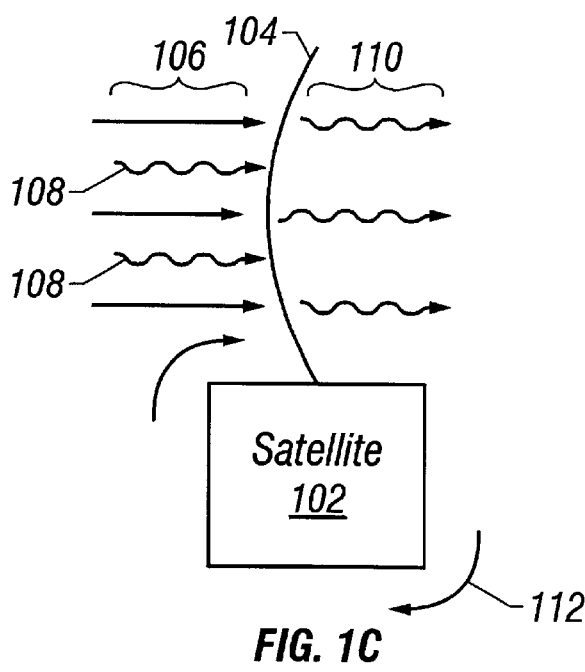

FIGS. 1A–1C are diagrams of a spacecraft 102 equipped with a solar wing 104 experiencing thermal shock as spacecraft 102 enters, traverses, and exits solar eclipse.

In FIG. 1A, solar wing 104 normally faces toward sunlight 106 for generating electrical energy. The flow of absorbed heat 108 and radiated heat 110 results in a temperature imbalance that imparts a convex shape to solar wing 104. Factors that may affect the shape of solar wing 104 are the bulk temperature effect resulting from laminar structure, the temperature gradient from the hot side to the cold side, and the materials and shape used in manufacturing.

In FIG. 1B, spacecraft 102 enters the eclipse region, and the heat flow reverses. The reversal of the heat flow results in a rapid temperature drop on the sunward side of solar wing 104. In this example, the temperature drop results in a shape change in solar wing 104 from convex to concave.

In FIG. 1C, spacecraft 102 exits the eclipse region, and another reversal of heat flow results in a rapid temperature increase on the sunward side of solar wing 104. As the temperature increases, solar wing 104 changes back to its former convex shape. For rapid temperature changes, the change in shape of solar wing 104 from convex to concave and from concave to convex may result in a quick motion or snap that imparts a sharp torque impulse 112 to spacecraft 102. Torque impulse 112 may result in mechanical feedback that disturbs the attitude of spacecraft 102 and degrades performance in applications that require precise pointing and positioning of spacecraft 102.

Figure 2:
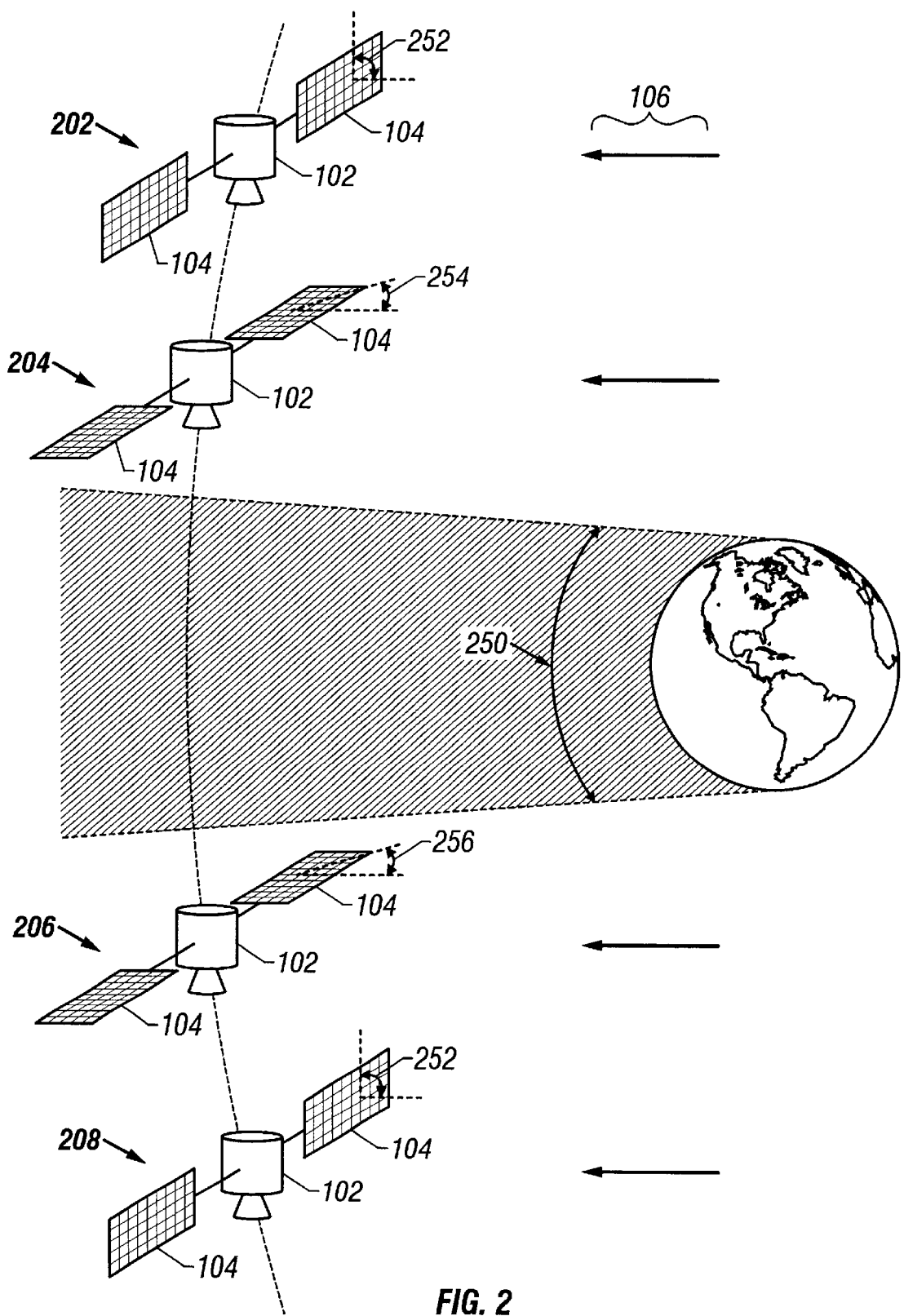
FIG. 2 is a diagram of a thermal shock avoidance maneuver by the spacecraft of FIG. 1 according to an embodiment of the invention.

FIG. 2 is a diagram of a thermal shock avoidance maneuver by the spacecraft of FIG. 1. Four successive positions of spacecraft 102, are shown with respect to solar eclipse region 250 as 202, 204, 206, and 208.

At position 202, solar wings 104 are oriented in their normal position for generating solar power, facing toward sunlight 106. A solar power generation angle 252 is defined for the normal position of solar wings 104 for generating electrical power by the angle between a plane representative of a surface of solar wings 104 and the direction of sunlight 106. A typical value for solar power generation angle 252 is 90 degrees, although other angles may be selected.

At position 204, solar wings 104 are rotated from solar power generation angle 252 to face away from sunlight 106 as spacecraft 102 approaches eclipse region 250 to control the heat flow rate and the corresponding temperature decrease of solar wings 104. An eclipse entry angle 254 is defined for the position of solar wings 104 facing away from sunlight 106 as the angle between a plane representative of a surface of solar wings 104 and the direction of sunlight 106. An exemplary value for eclipse entry angle 254 is 0 degrees. Other eclipse entry angles may be selected to suit specific applications.

By the time solar wings 104 enter eclipse region 250 they have slowly cooled to the point where thermal shock is mitigated and spacecraft attitude disturbances are moderated. The mechanical feedback from solar wings 104 during rotation may be further controlled by rotating solar wings 104 according to a selected eclipse entry slew profile.

At position 206, solar wings 104 exit eclipse region 250 and are rotated to exit angle 256 (which is typically the same as the eclipse entry angle 254).

At position 208, solar wings 104 are rotated back to solar power generation angle 252 to restore their normal position for generating solar power, thereby moderating the heat flow and corresponding temperature increase of solar wings 104 to mitigate thermal shock.

The mechanical feedback from solar wings 104 during rotation may be further controlled by rotating solar wings 104 according to a selected eclipse exit slew profile. Also, a start pulse may be generated to signal the start of rotation of solar wings 104 at eclipse entry and exit for compensating for remaining mechanical feedback by open loop compensation.

Figure 3:
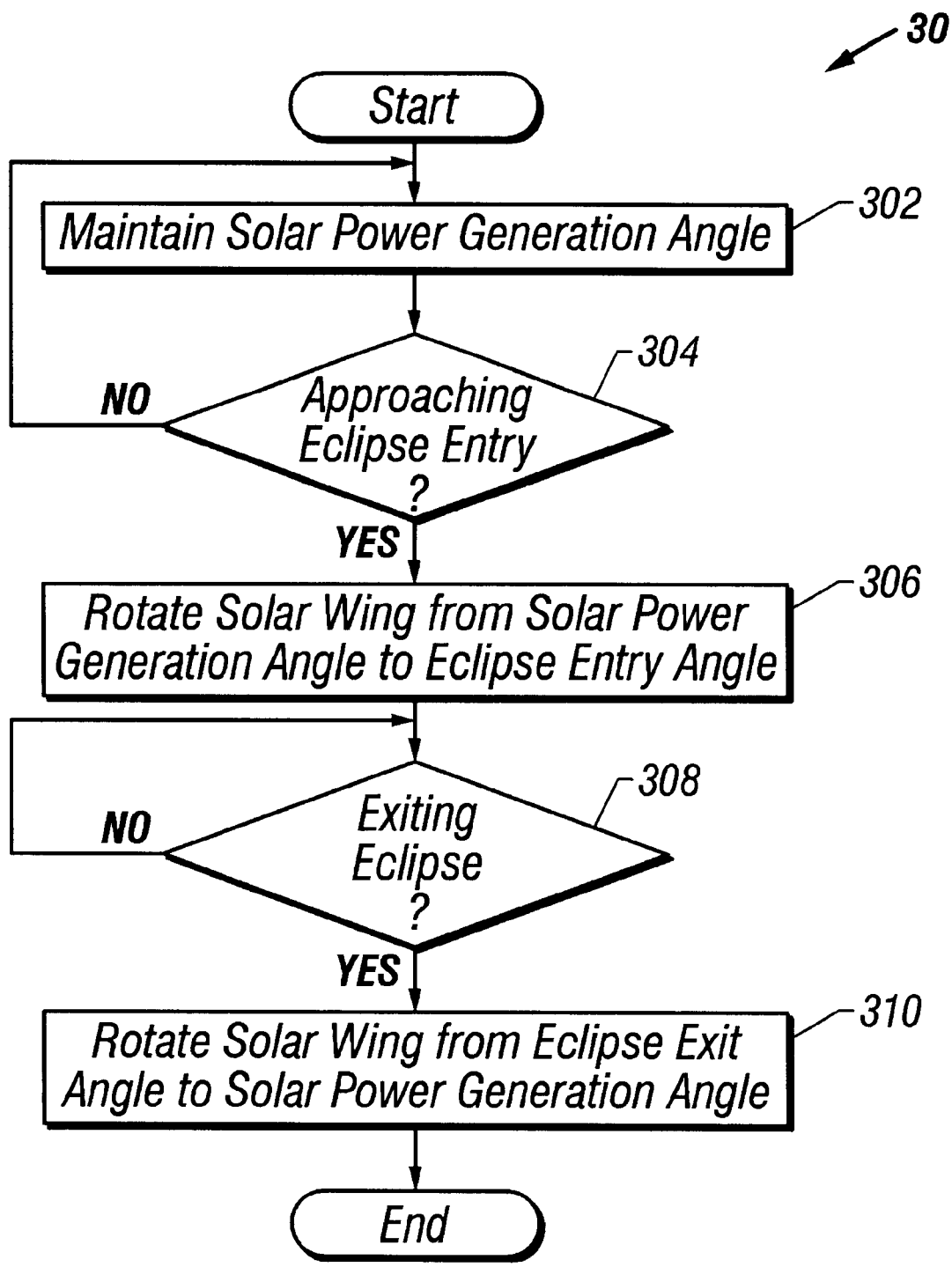
FIG. 3 is a flow chart of an exemplary method for performing the thermal shock avoidance maneuver according to an embodiment of the invention shown in FIG. 2.

FIG. 3 is a flow chart of an exemplary method for performing the thermal shock avoidance maneuver shown in FIG. 2. At step 302, solar wings 104 are maintained at solar power generation angle 252 facing sunlight 106 until spacecraft 102 approaches eclipse entry. If spacecraft 102 is approaching eclipse entry, step 304 transfers control to step 306. At step 306 solar wings 104 are rotated from solar power generation angle 252 to eclipse entry angle 254 according to a selected eclipse entry slew profile. If spacecraft 104 is exiting eclipse, step 308 transfers control to step 310. At step 310 solar wings 104 are rotated from an eclipse exit angle 256 to solar power generation angle 252 according to a selected eclipse exit slew profile. Solar wings 104 may be further rotated inside eclipse region 250 if it is desirable that eclipse exit angle 256 differ from eclipse entry angle 254. An advantage of the method for performing the thermal shock avoidance maneuver according to the embodiment of the invention described above is that it may be used with existing spacecraft and solar wing hardware by uploading software implementing the functions described above for FIG. 3.

Figure 4:
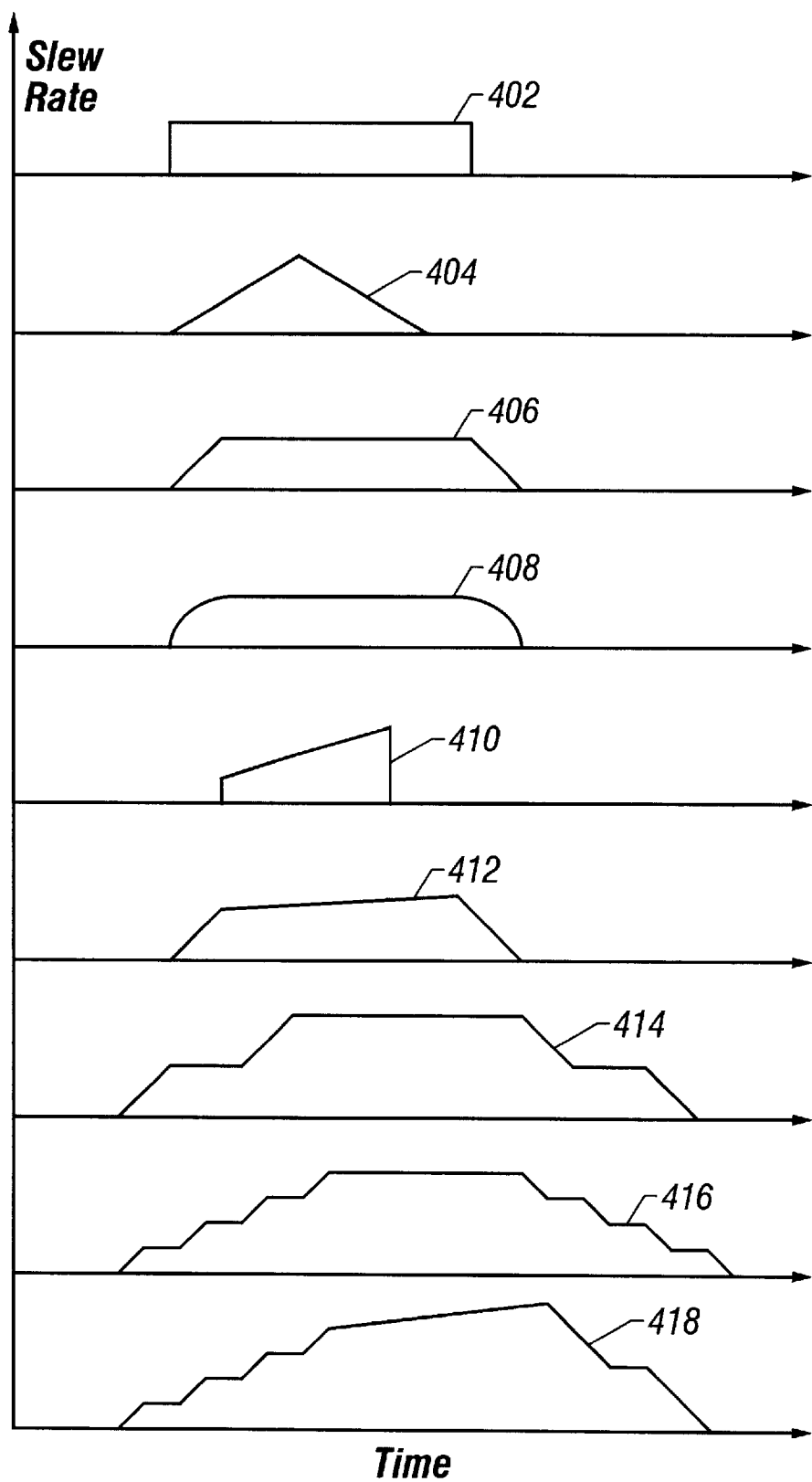
FIG. 4 is a series of exemplary solar wing slew profiles for use with the flow chart of FIG. 3 for reducing mechanical feedback according to an embodiment of the invention.

FIG. 4 is a series of exemplary solar wing slew profiles for use with the flow chart of FIG. 3 that may be used for rotating solar wings 104 at selected rates of rotation, i.e, slew rates. Slew rates may be varied in various ways to reduce mechanical feedback due to rotation of solar wings 104. For example, large solar wing surfaces may oscillate or wobble or generate torque in the spacecraft body as they rotate. The oscillation may be smoothed out or damped by appropriately varying the rate of rotation, or slew rate. The time interval during which solar wings 104 are rotated adds to the solar power down time after eclipse, therefore appropriate time scale selection for slew rate profiles 402–418 is determined by satellite storage battery life.

Slew rate profile 402 is slew rate limited only, for example, by a single wing drive stepping limit.

Slew rate profile 404 is acceleration limited by reaction wheel pitch torque only. This would be appropriate when the spacecraft pitch axis is aligned with the solar wing rotation axis, and the ability of the spacecraft reaction wheel to absorb pitch reaction torque is the dominant limitation.

Slew rate profile 406 is both slew rate limited, for example, by centripetal transverse torque, and acceleration limited. The centripetal transverse torque is an effect of the wing rotation axis not being a principal axis of inertia of the wing, for example, due to the wing curvature. The centripetal transverse torque is proportional to the wing slew rate and wing imbalance due to inertial cross-products and offset center of mass. This centripetal transverse torque is in addition to the transverse torque due to the wing thermal snap. Limiting the slew rate can ensure the satellite transverse torquing actuators have sufficient authority to counteract these disturbance torques.

Slew rate profile 408 is slew rate and acceleration limited with shared resource. This exemplifies a case where the actuators used to create pitch and transverse control torques are shared. For example, if the actuators were a reaction wheel pyramid, then the more the reaction wheels are used to provide transverse torque, the less reaction wheel pitch torque is available. As the slew rate increases, so does the centripetal transverse torque that must be countered, so the slew profile reduces the pitch acceleration/deceleration as the slew rate increases to ensure that the available transverse actuator torque is not exceeded.

Slew rate profile 410 reduces solar wing cross product torque with heating only. This exemplifies a case where the wing imbalance reduces as the wing approaches its thermal equilibrium shape. Since both the wing thermal snap torque and the wing imbalance decrease as equilibrium is approached, the slew profile may increase the slew rate as time goes on, since the increase in the centripetal transverse torque due to the increased slew rate is offset by the decrease due to the decreased wing imbalance.

Slew rate profile 412 reduces solar wing cross product torque with heating and is slew rate and pitch limited.

Slew rate profile 414 is pitch or transverse deadbeat limited. This slew profile reduces the reaction torque due to a wing flexible mode by splitting the acceleration into two segments, whose beginnings are separated by an odd number of wing flexible mode half-periods. This "deadbeat", or "posicast", strategy results in a cancellation of the modal excitation due to the first acceleration period by that due to the second acceleration period. A similar strategy is used for deceleration.

Slew rate profile 416 is both deadbeat transverse and pitch torque limited. There may be more than one flexible mode of importance, and it is known to apply the deadbeat principle to limit excitation of multiple modes by using more than two acceleration segments. Here four acceleration periods are used to control two flexible modes.

Slew rate profile 418 is deadbeat transverse and pitch torque limited at slew start and pitch torque limited only at slew end and is suitable for applications where the solar wing is straight at the end of the slew cycle. This profile illustrates the point that when the solar wing is straight at the end of the slew cycle, the wing slew axis may be nearly a wing principal axis. In this case, the coupling between the slew rate and the transverse flexible modes may be weak, and it may be unnecessary to limit the transverse flexible mode excitation due to deceleration by deadbeat.

Figure 5:
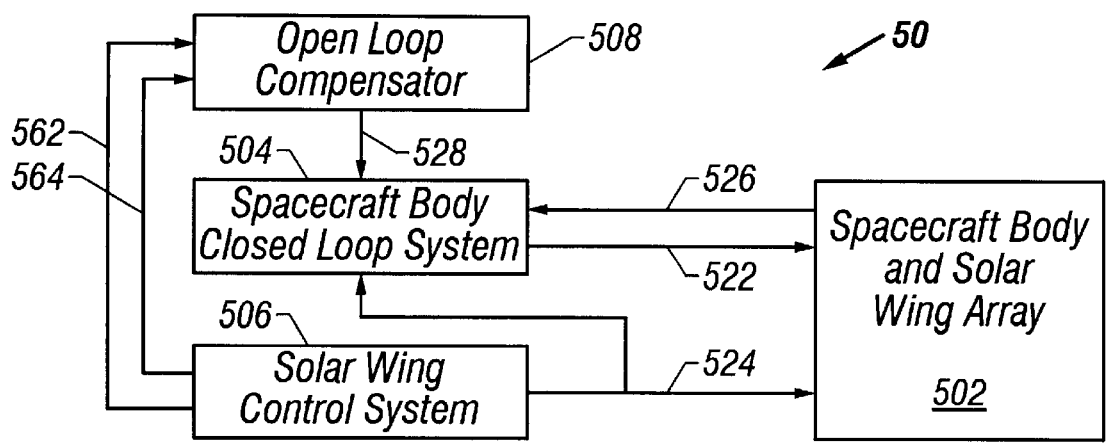
FIG. 5 is a block diagram of the spacecraft of FIG. 1 suitable for use with a solar wing control system according to an embodiment of the invention.

FIG. 5 is a block diagram 50 of the spacecraft of FIG. 1 suitable for use with a solar wing control system according to an embodiment of the invention. The spacecraft body and solar wing array 502 block represents the parts of spacecraft 102 and solar wings 104 in FIG. 1 that move in response to drive signals and may be made according to techniques well known in the art.

Spacecraft body and solar wing array 502 inputs spacecraft actuator drive signal 522 and solar wing actuator drive signal 524 to control the motion of spacecraft 102 and solar wings 104 respectively. Spacecraft body and solar wing array 502 outputs spacecraft dynamics data 526 that includes motion parameters such as pitch, roll, and yaw to spacecraft body closed loop system 504.

Spacecraft body closed loop system 504 inputs solar wing actuator drive signal 524 from solar wing control system 506 and also feed forward compensation signal 528 from open loop compensator 508 to control the motion of spacecraft body and solar wing array 502 by outputting spacecraft actuator drive signal 522 to spacecraft body and solar wing array 502.

Solar wing control system 506 outputs solar wing drive signal 524 to spacecraft body and solar wing array 502 to control the rotation of solar wings 104 and also to spacecraft body closed loop system 504. Solar wing control system 506 also outputs start pulses 562 and 564 to open loop compensator 508 to signal the start of the eclipse entry slew and the eclipse exit slew, respectively.

Open loop compensator 508 provides open loop compensation synchronized by start pulse 562 or 564 to counter the mechanical feedback imparted to spacecraft 102 by rotation and residual thermal shock of solar wing array 104.

Spacecraft body and solar wing array 502, spacecraft body closed loop control system 504, and open loop compensator 508 may be made according to well known techniques and arranged with solar wing control system 506 as shown in FIG. 5.

Figure 6:
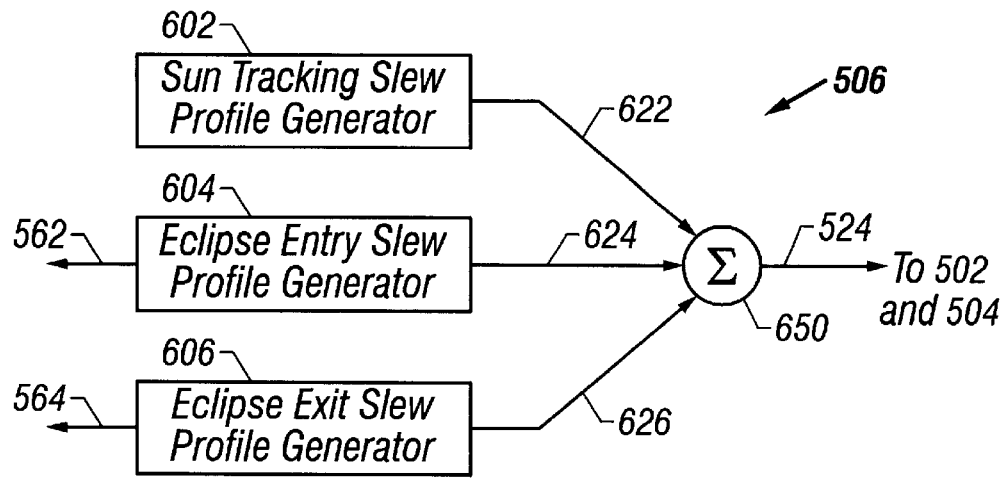
FIG. 6 is a detailed diagram of the solar wing control system of FIG. 5.

FIG. 6 is a detailed diagram of the solar wing control system 506 of FIG. 5. Solar wing control system 506 includes a sun tracking slew profile generator 602 for maintaining solar wings 104 at solar power generation angle 252, an eclipse entry slew profile generator 604 for rotating solar wings 104 from solar power generation angle 252 to eclipse entry angle 254 according to a selected eclipse entry slew profile, and an eclipse exit slew profile generator 606 for rotating solar wings 104 from eclipse exit angle 256 to solar power generation angle 252 according to a selected eclipse exit slew profile. Because thermal shock is generally not so severe on eclipse entry, eclipse entry slew profile generator 604 may be optionally omitted.

Sun tracking slew profile generator 602 outputs a solar wing normal output 622 for maintaining solar power generation angle 252 according to well known techniques, for example, by stepping at a constant rate with respect to the spacecraft body with an offset updated daily by a sun sensor mounted on the spacecraft body. The azimuth of the solar wing normal in the spacecraft body may be tracked by book-keeping the step commands sent to the solar wing azimuthal stepper motor (solar wing drive) in dead reckoning fashion. Another solar azimuth tracking method that works well on geosynchronous spacecraft is to correct the solar wing to spacecraft body angle using the sum of the angles between the solar wing and the spacecraft body and between the spacecraft body and the sun. Another suitable solar azimuth tracking method is to null the output of a solar array mounted sun sensor.

A preferred solar azimuth tracking method compares the step count, which aligns the solar wing normal most closely parallel to the line from the solar wing to the sun, of the solar wing azimuth stepper motor (dead reckoning) to a calculation of the step count from the spacecraft attitude and an ephemeris model where the sun is in the body. The stepper motor is then commanded to step to remove the difference. In some modes, an azimuth potentiometer is used rather than the step count to track the solar wing to spacecraft body azimuthal angle.

Eclipse entry slew profile generator 604 and eclipse exit slew profile generator 606 respectively output selected slew rate profiles as eclipse entry slew rate output 624 and eclipse exit slew rate output 626. Slew rate outputs 624 and 626 are summed with solar wing normal output 622 by summer 650 to generate solar wing actuator drive signal 524. Slew rate outputs 624 and 626 may be selected from the examples shown in FIG. 4 to suit specific applications. Solar wing actuator drive signal 524 is output to spacecraft body closed loop control system 504 and to a solar wing actuator in spacecraft body and solar wing array 502 to rotate solar wings 104 while maintaining spacecraft 102 in a stable attitude.

Start pulses 562 and 564 output respectively from eclipse entry slew profile generator 604 and eclipse exit slew profile generator 606 are output to open loop compensator 508 to initiate compensation for mechanical feedback imparted to spacecraft 102 by rotation and residual thermal shock of solar wings 104. Start pulses 562 and 564 may be generated, for example, by an on-board ephemeris output when the angle between a vector from the satellite to the earth and a vector from the satellite to the sun exceeds the sum of the earth radius, the sun radius, the ephemeris angle uncertainty of the earth, and the ephemeris angle uncertainty to the sun.

Figure 7:
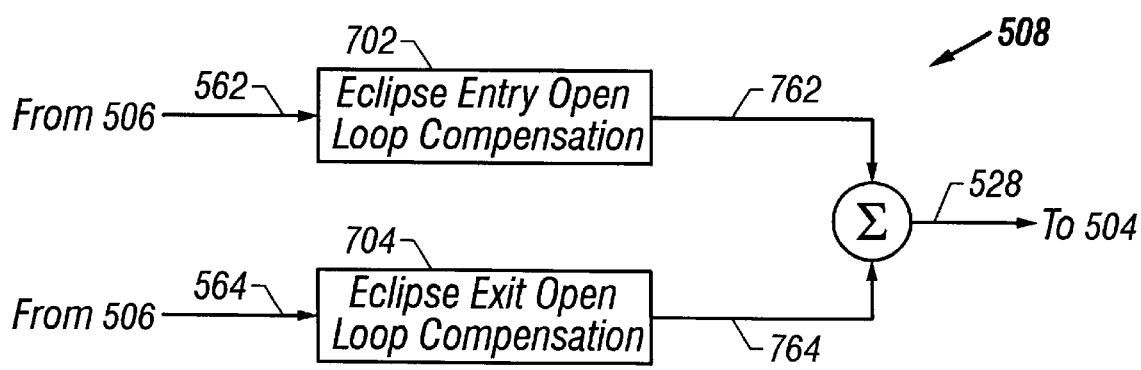
FIG. 7 is a detailed diagram of the open loop compensator of FIG. 5.

FIG. 7 is a detailed diagram of open loop compensator 508 of FIG. 5. Open loop compensator 508 accepts start signals 562 and 564 from solar wing control system 506 and outputs feed forward compensation signal 528 to spacecraft body closed loop system 504. Open loop compensator 508 includes an eclipse entry open loop compensation block 702 and an eclipse exit open loop compensation block 704. Eclipse entry open loop compensation block 702 outputs a feed forward torque profile 762 based on the expected wing reaction torques due to the eclipse entry slew profile due to thermal snap and dynamic effects. This torque profile may consist of torques about three orthogonal axes, and may be computed from a pre-calculated thermal profile and dynamic profile calculated in turn from the eclipse entry slew profile. The compensation torque profile 762 is triggered by start pulse 562.

Eclipse exit open loop compensation block 704 outputs a feed forward torque profile 764 based on the expected wing reaction torques due to the eclipse entry slew profile due to thermal snap and dynamic effects. This torque profile may consist of torques about three orthogonal axes, and may be computed from a pre-calculated thermal profile and dynamic profile calculated in turn from the eclipse entry slew profile. The compensation torque profile 764 is triggered by start pulse 564.

Feedforward torque profiles 762 and 764 are summed to form feed forward compensation signal 528 which is sent to spacecraft body closed loop system 504.

Other modifications, variations, and arrangements of the present invention may be made in accordance with the above teachings other than as specifically described to practice the invention within the scope of the following claims.

What is claimed is:

1. A method for avoiding thermal shock to a satellite solar wing comprising the step of controlling a solar wing heating rate of the solar wing to mitigate thermal shock upon exiting eclipse by rotating, upon exiting eclipse, the solar wing from an eclipse exit angle to a solar power generation angle.

2. The method of claim 1 further comprising the step of generating a start pulse representative of a start time of rotation of the solar wing.

3. The method of claim 2 further comprising the step of initiating compensation for the solar wing rotation from the start pulse.

4. The method of claim 3 wherein the compensation is open loop compensation.

5. The method of claim 1 wherein the step of controlling comprises controlling by rotating the solar wing according to a selected eclipse exit slew profile for countering mechanical feedback and residual thermal shock from the solar wing.

6. The method of claim 5 wherein the eclipse exit slew profile is one of slew rate limited, acceleration limited, pitch torque limited, and transverse deadbeat limited.

7. The method of claim 5 wherein the eclipse exit slew profile is deadbeat transverse and pitch torque limited at slew start and pitch limited at slew end.

8. The method of claim 1 further including the step of controlling a solar wing cooling rate of the solar wing to mitigate thermal shock upon entering eclipse by rotating the solar wing from the solar power generation angle to an eclipse entry angle.

9. The method of claim 8 wherein the step of controlling comprises controlling by rotating the solar wing according to a selected eclipse entry slew profile for countering mechanical feedback and residual thermal shock from the solar wing.

10. The method of claim 9 wherein the eclipse entry slew profile is one of slew rate limited, acceleration limited, pitch torque limited, and transverse deadbeat limited.

11. The method of claim 9 wherein the eclipse entry slew profile is transverse deadbeat and pitch torque limited at slew start and pitch limited at slew end.

12. A solar wing control system for avoiding thermal shock to a solar wing comprising an eclipse exit slew profile generator having an eclipse exit slew rate output for controlling a solar wing heating rate of the solar wing to mitigate thermal shock upon exiting eclipse by rotating, upon exiting eclipse, the solar wing from an eclipse exit angle to a solar power generation angle.

13. The solar wing control system of claim 12 wherein the eclipse exit slew rate output is varied to counter mechanical feedback and residual thermal shock from the solar wing.

14. The solar wing control system of claim 12 wherein the eclipse exit slew rate profile generator generates a start pulse representative of a start time of rotation of the solar wing.

15. The solar wing control system of claim 14 further comprising a compensator for initiating compensation for the solar wing rotation from the start pulse.

16. The solar wing control system of claim 15 wherein the compensator is an open loop compensator.

17. The solar wing control system of claim 12 further comprising an eclipse entry slew profile generator having an eclipse entry slew rate output for controlling a solar wing cooling rate of the solar wing to mitigate thermal shock upon entering eclipse by rotating the solar wing from the solar power generation angle to an eclipse entry angle.

18. The solar wing control system of claim 17 wherein the eclipse entry slew rate output is varied to counter mechanical feedback and residual thermal shock from the solar wing.

19. The solar wing control system of claim 17 wherein the eclipse entry slew rate profile generator generates a start pulse representative of a start time of rotation of the solar wing.

20. The solar wing control system of claim 19 further comprising a compensator for initiating compensation for the solar wing rotation from the start pulse.

21. The solar wing control system of claim 20 wherein the compensator is an open loop compensator.

22. The solar wing control system of claim 12 further comprising a sun tracking slew profile generator having a solar wing normal output for maintaining the solar wing at the solar power generation angle.

* * * * *